United States Patent
Lee et al.

(10) Patent No.: US 12,145,672 B2
(45) Date of Patent: Nov. 19, 2024

(54) SYSTEM AND METHOD OF CONTROLLING STEERING OF REAR AXLE STEERING DEVICE

(71) Applicants: Hyundai Motor Company, Seoul (KR); Kia Corporation, Seoul (KR)

(72) Inventors: Chi Woo Lee, Bongdong-Eup (KR); Hyun Uk Seo, Suwon-Si (KR); Jun Gyu Kim, Goyang-Si (KR); Seo An Lee, Hwaseong-Si (KR); Jae Eon Ryu, Ulsan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 259 days.

(21) Appl. No.: 17/840,351

(22) Filed: Jun. 14, 2022

(65) Prior Publication Data

US 2023/0136339 A1 May 4, 2023

(30) Foreign Application Priority Data

Nov. 2, 2021 (KR) .......................... 10-2021-0148780

(51) Int. Cl.
*B62D 6/00* (2006.01)

(52) U.S. Cl.
CPC ............. *B62D 6/002* (2013.01); *B62D 6/001* (2013.01)

(58) Field of Classification Search
CPC ...... B62D 6/002; B62D 6/001; B62D 15/025; B62D 7/159; B60W 10/20; B60W 2554/20; B60Y 2400/84
USPC ....................................................... 701/41–44
See application file for complete search history.

(56) References Cited

FOREIGN PATENT DOCUMENTS

| DE | 102013208484 | * | 4/2018 | ............ B62D 7/09 |
| --- | --- | --- | --- | --- |
| FR | 2947234 | * | 12/2010 | ............ B62D 17/00 |
| JP | 3289772 | * | 6/2002 | ............ B62D 6/00 |
| JP | 4291625 | * | 7/2009 | ............ B62D 6/00 |
| JP | 4639450 | * | 2/2011 | ............ B62D 6/00 |
| JP | 6202700 | * | 9/2017 | ............ B62D 6/00 |
| KR | 10-2020-0062821 | | 6/2020 | |

* cited by examiner

*Primary Examiner* — Hai H Huynh
(74) *Attorney, Agent, or Firm* — Morgan, Lewis & Bockius LLP (57) ABSTRACT

A system and method of controlling steering of a rear axle steering device is configured so that conditions, under which the rear axle steering device is operated, are diversified during traveling of a vehicle to allow the rear axle steering device to be used universally, facilitating stable traveling of the vehicle.

19 Claims, 6 Drawing Sheets

SYSTEM AND METHOD OF CONTROLLING STEERING OF REAR AXLE STEERING DEVICE

CROSS-REFERENCE TO RELATED APPLICATION

The present application claims priority to Korean Patent Application No. 10-2021-0148780, filed on Nov. 2, 2021, the entire contents of which is incorporated herein for all purposes by this reference.

BACKGROUND OF THE PRESENT DISCLOSURE

Field of the Present Disclosure

The present disclosure relates to a system and method of controlling steering of a rear axle steering device configured so that conditions, under which the rear axle steering device is operated, are diversified during traveling of a vehicle to allow the rear axle steering device to be used universally, facilitating stable traveling of the vehicle.

Description of Related Art

Vehicles are classified as passenger cars, vans, buses, and trucks in accordance with usage and purpose thereof.

Large vehicles such as buses and trucks receive great resistance from the ground when turning left or right due to the great length thereof. For the present reason, the wear amount of a tire of such a large vehicle increases, increasing the turning radius of the vehicle.

To solve such a problem, a rear axle steering device is employed in a large vehicle.

With the rear axle steering device provided in the large vehicle, the steering angle of the steering wheel of the vehicle is controlled to adjust the steering angle of the rear wheels of the vehicle together with the steering angle of the front wheels of the vehicle, reducing the turning radius of the vehicle and facilitating smooth turning of the vehicle.

When the rear axle steering device is employed in a large vehicle such as a bus, whether to operate the rear axle steering device is determined by a control logic called a bus stop mode.

In other words, in the case of a bus, the rear axle steering device is controlled based on the condition in which the door is opened or closed in accordance with whether a passenger enters the bus. For example, because a bus has a large turning radius, the rear of the bus may collide with a person who may be at a bus stop. For the present reason, when the bus arrives at the bus stop, the door is opened and a passenger gets on the bus, and when the door is closed and the bus departs the bus stop, the rear axle steering device is controlled to adjust the turning radius of the bus to prevent an accident in which a person at the bus stop collides with the bus.

However, in the case of a bus, even if the bus arrives at the bus stop, the bus departs without opening and closing the door when there is no one getting on or off. In the instant case, because the bus stop mode is performed based on whether the door is opened or closed, when the bus departs from the bus stop, controlling, by the rear axle steering device, the rear wheel steering angle to be set as a neutral steering angle is not performed. Accordingly, the turning radius of the bus is increased, causing an accident in which the bus collides with the bus stop or with a vehicle in the vicinity thereof.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and method of controlling steering of a rear axle steering device configured so that conditions, under which the rear axle steering device is operated, are diversified during traveling of a vehicle to allow the rear axle steering device to be used universally, facilitating stable traveling of the vehicle and preventing accidents.

In accordance with an aspect of the present disclosure, the above and other objects may be accomplished by the provision of a steering control system of a rear axle steering device including a rear axle steering device configured to control a rear wheel steering angle of a vehicle, a determiner configured to determine whether an avoidance target area is present around the vehicle, and a controller configured to control the rear axle steering device to set the rear wheel steering angle as a neutral steering angle when the determiner determines that the avoidance target area is present around the vehicle.

The determiner may store a bus stop as an avoidance target area, and communicate with a nearby bus stop to determine whether the vehicle enters the bus stop.

When the determiner inputs the bus stop as an avoidance target area, the controller may be configured to control the rear axle steering device to set the rear wheel steering angle as a neutral steering angle when the vehicle enters the bus stop and then departs.

The controller may check whether the vehicle departs after entering the bus stop, and control the rear axle steering device so that the rear wheel steering angle is controlled to be normal while the vehicle travels more than a set distance when departing.

The determiner may store an obstacle including other vehicles as an avoidance target area, and detect whether an obstacle is present around the vehicle.

When the determiner inputs an obstacle including other vehicles as an avoidance target area, the controller may be configured to control the rear axle steering device to set the rear wheel steering angle as a neutral steering angle while the vehicle performs turning thereof.

The determiner may check information on the distance between the vehicle and the obstacle, and the controller may be configured to control the rear axle steering device to set the rear wheel steering angle as a neutral steering angle when the distance between the vehicle and the obstacle is less than or equal to a predetermined distance.

While the vehicle performs turning when an obstacle is identified, the controller may be configured to control the rear axle steering device so that the rear wheel steering angle is controlled to be normal when the vehicle travels more than a set distance.

The controller is configured to receive information on the traveling speed of the vehicle, and when the traveling speed is greater than or equal to a predetermined speed, the controller may be configured to control the rear axle steering device to decrease the rear wheel steering angle based on the increment in the traveling speed of the vehicle.

In accordance with another aspect of the present disclosure, there is provided a steering control method of a rear axle steering device, the method including determining whether an avoidance target area is present around the vehicle, and controlling a rear axle steering device to set a rear wheel steering angle as a neutral steering angle upon determining that the avoidance target area is present around a vehicle in the determining.

In the determining, a bus stop may be stored as an avoidance target area, and whether the vehicle enters the bus stop may be determined by the traveling direction of the vehicle.

In the controlling, when the bus stop is input as the avoidance target area, the rear axle steering device may be controlled so that the rear wheel steering angle is set as the neutral steering angle when the vehicle enters the bus stop and then departs.

In the controlling, whether the vehicle departs after entering the bus stop is determined, and the rear axle steering device may be controlled so that the rear wheel steering angle is controlled to be normal when the vehicle departs and travels more than a set distance.

In the determining, an obstacle including other vehicles may be stored as an avoidance target area, and whether an obstacle is present around the vehicle may be determined.

In the controlling, when an obstacle including other vehicles is input as an avoidance target area, the rear axle steering device may be controlled so that the rear wheel steering angle is set as a neutral steering angle while the vehicle performs turning thereof.

The information on the distance between the vehicle and the obstacle may be checked in the determining, and the rear axle steering device may be controlled so that the rear wheel steering angle is set as a neutral steering angle when the distance between the vehicle and the obstacle is less than or equal to a predetermined distance in the controlling.

When the vehicle performs turning when an obstacle is identified, the rear axle steering device may be controlled so that the rear wheel steering angle is controlled to be normal when the vehicle travels more than the set distance in the controlling.

The steering control method of the rear axle steering device further includes determining speed, in which information on the traveling speed of the vehicle is received, wherein, when the traveling speed is greater than or equal to a predetermined speed, the rear axle steering device may be controlled to decrease the rear wheel steering angle based on the increment in the traveling speed of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplary embodiments of the present disclosure, examples of which are illustrated in the accompanying drawings. Wherever possible, the same reference numbers will be used throughout the drawings to refer to the same or like parts.

Hereinafter, a system and method of controlling steering of a rear axle steering device according to exemplary embodiments of the present disclosure will be described with reference to the accompanying drawings.

Figure 1:
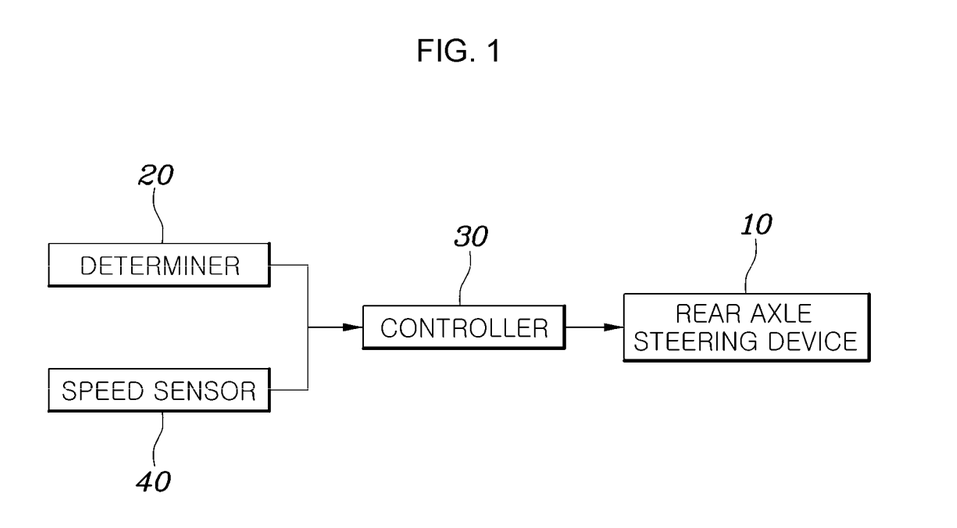
FIG. 1 is a block diagram of a steering control system of a rear axle steering device according to an exemplary embodiment of the present disclosure.
Figure 2:
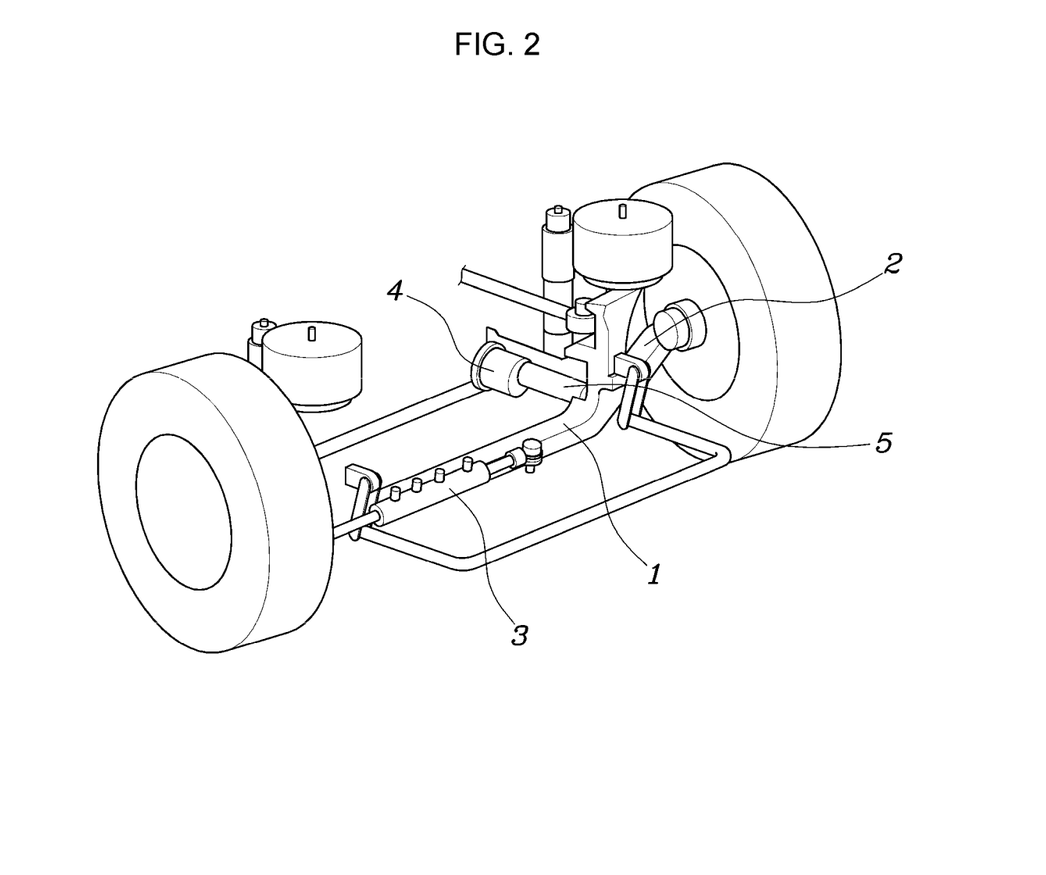
FIG. 2 is a view exemplarily illustrating an exemplary embodiment of the rear axle steering device.
Figure 3:
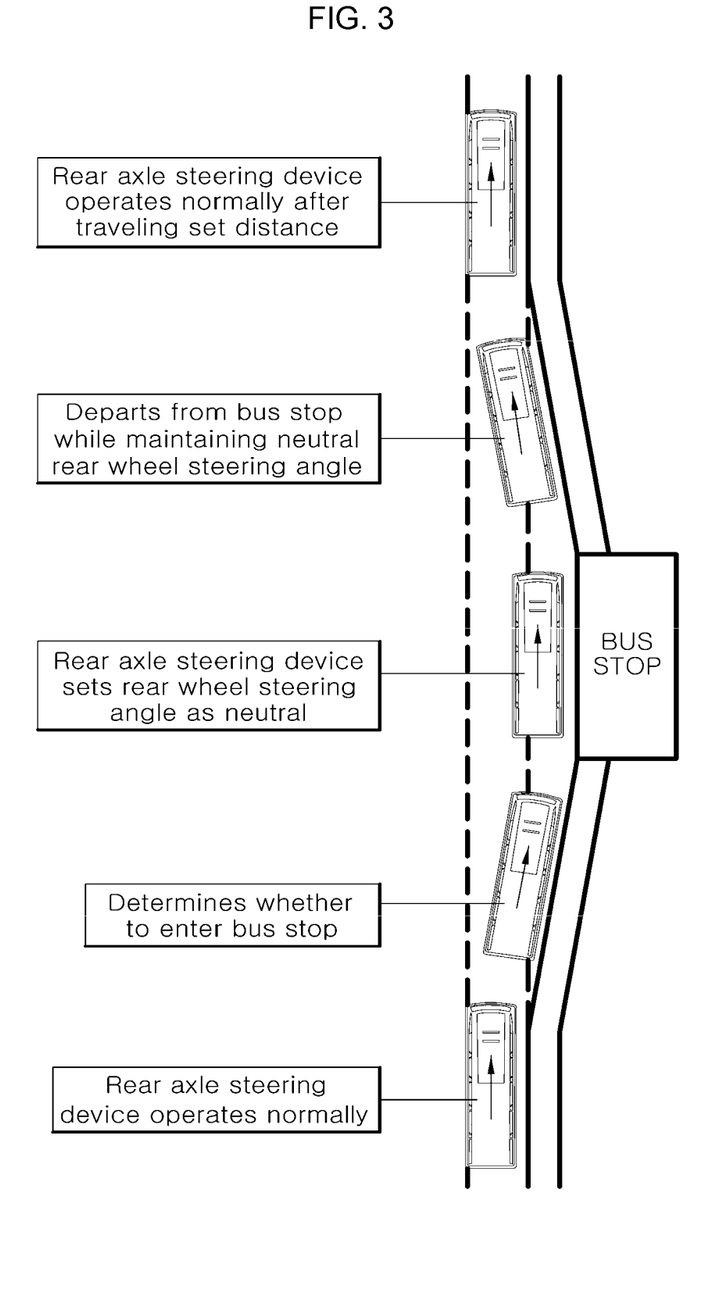
FIG. 3 is a view explaining controlling of the rear axle steering device according to the exemplary embodiment of the present disclosure.
Figure 4:
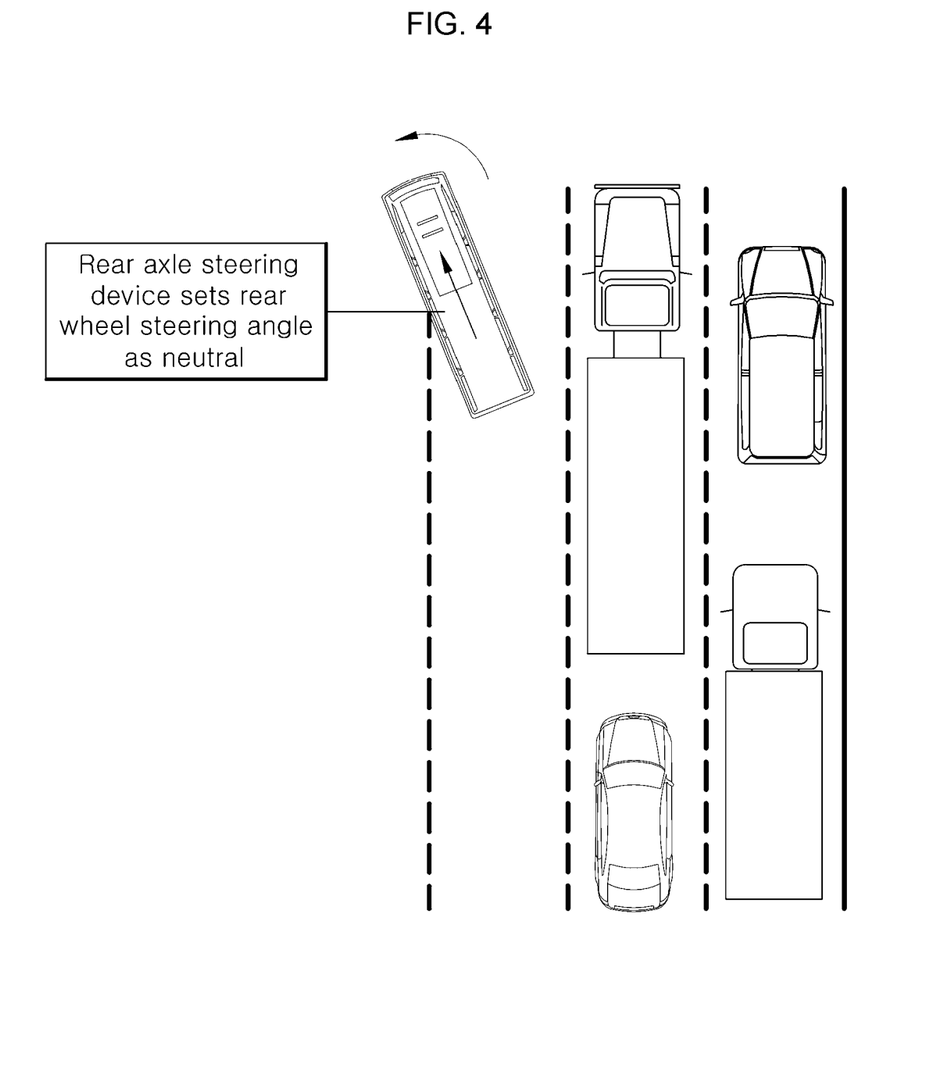
FIG. 4 is a view explaining controlling of a rear axle steering device according to various exemplary embodiments of the present disclosure.

FIG. 1 is a block diagram of a steering control system of a rear axle steering device according to an exemplary embodiment of the present disclosure, FIG. 2 is a view exemplarily illustrating an exemplary embodiment of the rear axle steering device, FIG. 3 is a view explaining controlling of the rear axle steering device according to the exemplary embodiment of the present disclosure, and FIG. 4 is a view explaining controlling of a rear axle steering device according to various exemplary embodiments of the present disclosure.

Figure 5:
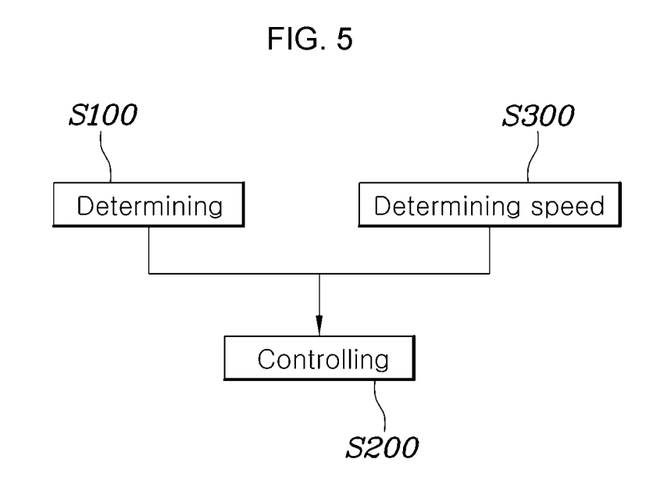
FIG. 5 is a flowchart of a steering control method of the rear axle steering device according to an exemplary embodiment of the present disclosure.
Figure 6:
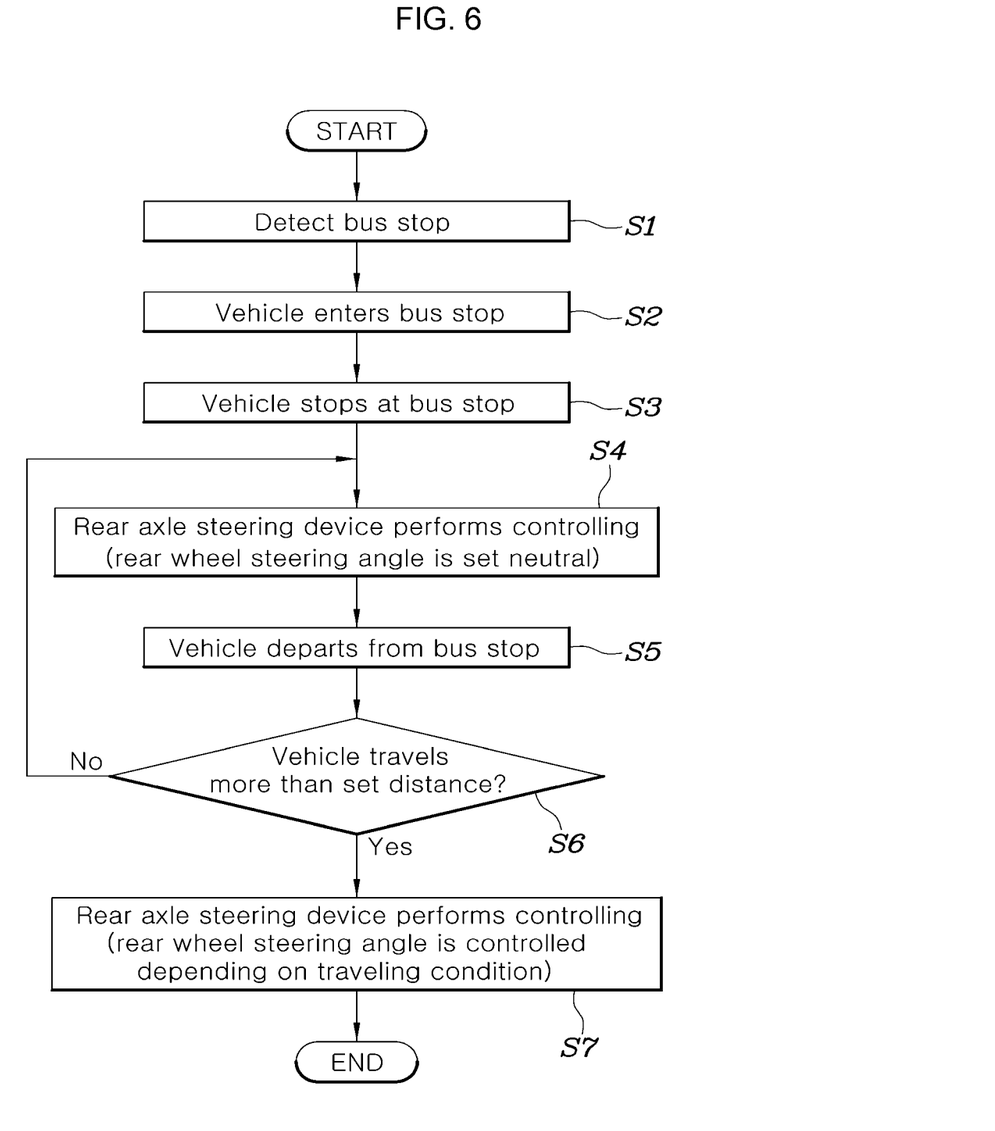
FIG. 6 is a flowchart explaining controlling of the rear axle steering device according to the exemplary embodiment of the present disclosure.
Figure 7:
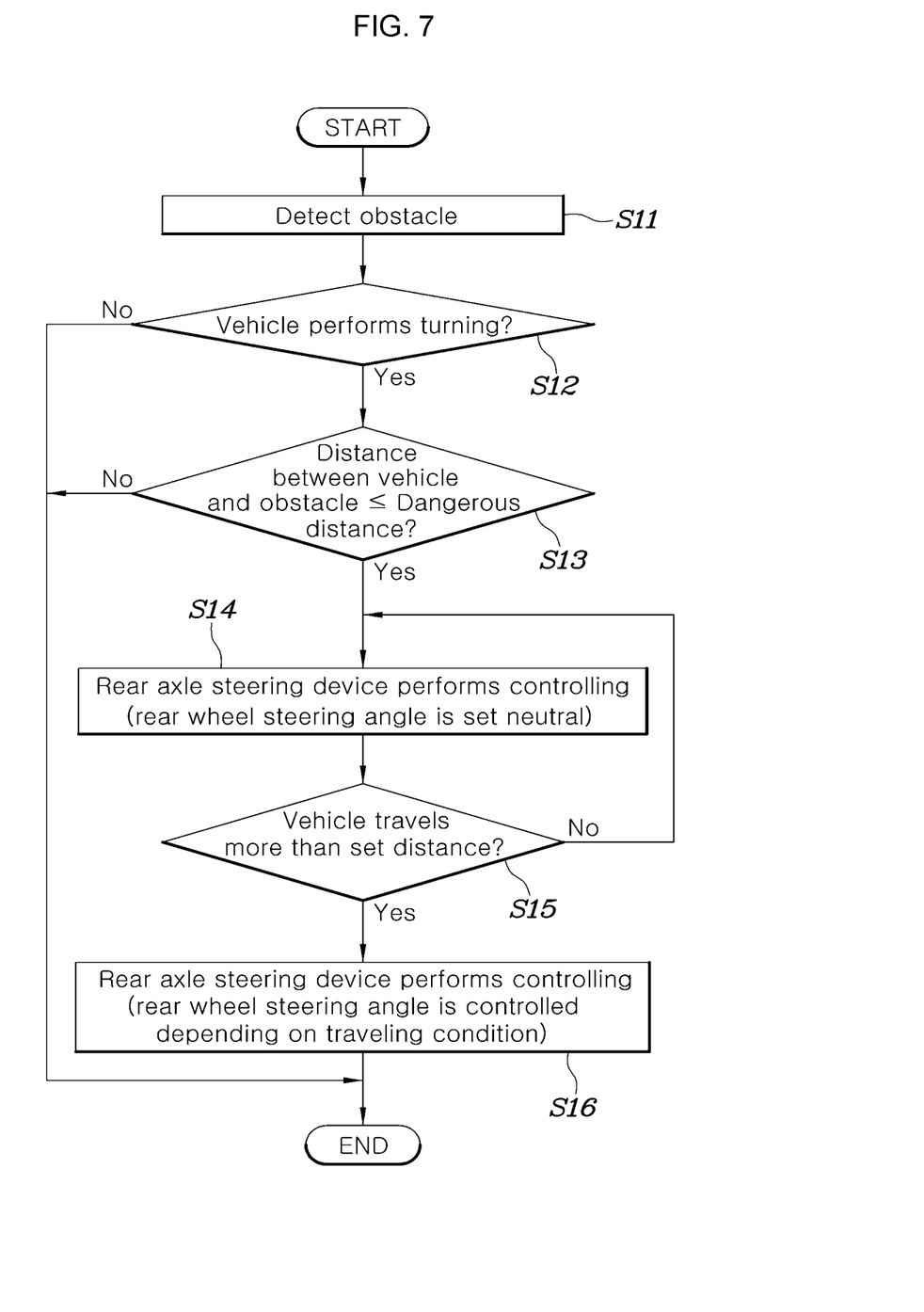
FIG. 7 is a flowchart explaining controlling of the rear axle steering device according to the other embodiment of the present disclosure.

FIG. 5 is a flowchart of a steering control method of the rear axle steering device according to an exemplary embodiment of the present disclosure, FIG. 6 is a flowchart explaining controlling of the rear axle steering device according to the exemplary embodiment of the present disclosure, and FIG. 7 is a flowchart explaining controlling of the rear axle steering device according to the other embodiment of the present disclosure.

As illustrated in FIG. 1, a steering control system of a rear axle steering device according to an exemplary embodiment of the present disclosure includes a rear axle steering device 10 configured to control a rear wheel steering angle of a vehicle, a determiner 20 configured to determine whether an avoidance target area is present around the vehicle, a controller 30 configured to control the rear axle steering device 10 to set the rear wheel steering angle as a neutral steering angle when the determiner 20 determines that an avoidance target area is present around the vehicle.

The vehicle according to an exemplary embodiment of the present disclosure may be a large vehicle including a bus or a truck, and may also be a variety of vehicles.

In an exemplary embodiment of the present disclosure, as illustrated in FIG. 2, the rear axle steering device 10 may be provided between a rear axle 1 and a rear wheel 2, and may include a rear wheel steering cylinder 3 in which a piston is connected to the rear wheel and moves linearly, a motor 4 configured to provide rotational driving force, and a power transmission apparatus 5 configured to convert the rotational driving force provided from the motor 4 into linear driving force and transmit the converted driving force to the piston. The rear axle steering device 10 is configured to adjust the rear wheel steering angle, and may be implemented in various embodiments.

When controlling the rear axle steering device 10 in an exemplary embodiment of the present disclosure, the determiner 20 determines whether an avoidance target area is present around the vehicle, and the controller 30 controls the rear axle steering device 10 in accordance with whether the avoidance target area is present.

In other words, the determiner 20 determines whether the avoidance target area is present around the vehicle. Here, the avoidance target area may be an object or a location that interferes with the vehicle while the vehicle performs turning. Furthermore, the determiner 20 may identify the avoidance target area through Global Positioning System (GPS) information, communication with the object, and various detectors.

The controller 30 receives information indicating whether the avoidance target area is present from the determiner 20 and controls the rear axle steering device 10. When the determiner 20 determines that the avoidance target area is present in the vicinity of the vehicle, the controller 30 controls the rear axle steering device 10 to set the rear wheel steering angle as a neutral steering angle, preventing accidents in which the rear of the vehicle interferes with the avoidance target area due to the increase in the turning radius of the vehicle.

In the case of a vehicle such as a bus, the neutral state of the rear wheel steering is maintained depending on the door opening and closing conditions. However, in an exemplary embodiment of the present disclosure, the rear axle steering device 10 is controlled depending on not only the door opening and closing conditions but also on whether the avoidance target area is present, and accordingly, conditions, under which the rear axle steering device 10 is operated, are diversified during traveling of a vehicle, facilitating stable traveling of the vehicle and preventing accidents.

In detail with respect to the present disclosure described above, the determiner 20 stores a bus stop as an avoidance target area, and communicates with a nearby bus stop to determine whether the vehicle enters the bus stop.

Here, when the determiner 20 inputs the bus stop as an avoidance target area, the controller 30 controls the rear axle steering device 10 to set the rear wheel steering angle as a neutral steering angle when the vehicle enters the bus stop and then departs.

At the bus stop, people are present or the vehicle performs turning in a limited space. For the present reason, to prevent an accident at the bus stop which may be caused by the turning of the vehicle, the rear axle steering device 10 is controlled when the vehicle enters the bus stop and then departs. Accordingly, the vehicle may stably travel without interfering with the avoidance target area when departing from the bus stop.

As illustrated in FIG. 3, when the vehicle enters the bus stop, the rear axle steering device 10 operates normally. In other words, before the vehicle enters the bus stop, the rear axle steering device 10 is controlled appropriately for the traveling state of the vehicle.

At the present time, the determiner 20 may determine whether the vehicle enters the bus stop by communicating with the bus stop, or collecting location information through GPS or bus stop information through a detector.

In the present way, when the vehicle enters the bus stop, the controller 30 controls the rear axle steering device 10 to set the rear wheel steering angle as a neutral steering angle. Accordingly, the rear wheel steering of the vehicle is aligned to be neutral when the vehicle departs from the bus stop, so that the rear of the vehicle does not invade the bus stop and safely departs therefrom.

Furthermore, the controller 30 checks whether the vehicle departs after entering the bus stop, and controls the rear axle steering device 10 so that the rear wheel steering angle is controlled to be normal while the vehicle travels more than a set distance when departing.

Here, the set distance may be a distance at which the vehicle leaves the bus stop and does not interfere with people or obstacles at the bus stop. Furthermore, the set distance may be a distance from the bus stop to the point at which the vehicle re-enters a travel lane.

Accordingly, the controller 30 controls the rear wheel steering angle to be neutral when the vehicle departs from the bus stop to avoid interference between the vehicle and the bus stop. When the vehicle travels more than the set distance, this means that the vehicle has left the bus stop and safety is ensured, whereby the rear wheel steering angle is controlled depending on the traveling condition of the vehicle.

As described above, in an exemplary embodiment of the present disclosure, the rear axle steering device 10 is controlled depending on whether the vehicle enters the bus stop or departs after entering the bus stop, allowing the vehicle to travel stably while avoiding collision with facilities or people at the bus stop.

Meanwhile, the determiner 20 stores an obstacle including other vehicles as an avoidance target area, and detects an obstacle around the vehicle.

Here, the determiner 20 inputs an obstacle including other vehicles as an avoidance target area, and the controller 30 controls the rear axle steering device 10 to set the rear wheel steering angle as a neutral steering angle while the vehicle performs turning.

In other words, when the vehicle travels on a road, various obstacles including other vehicles may be present around the vehicle, and when the vehicle performs turning on the road, which is divided by lanes, collision with surrounding obstacles should be avoided. In the case of a large vehicle, when the rear axle steering device 10 operates to reduce the turning radius, it is necessary to prevent an accident caused by colliding with an adjacent obstacle. To avoid such an accident, the determiner 20 stores an obstacle including other vehicles as an avoidance target area, and controls the rear axle steering device 10 based on whether the avoidance target area is present during turning of the vehicle.

For example, when the vehicle travels linearly or there is no obstacle around the vehicle, the rear axle steering device 10 is operated normally to reduce the turning radius. The rear axle steering device 10 is controlled based on the traveling state of the vehicle until the vehicle performs turning in the presence of nearby obstacles.

Here, the determiner 20 may identify an obstacle adjacent to the vehicle through communication with a camera detector or other vehicles.

The determiner 20 checks the distance between the vehicle and the obstacle, and the controller 30 controls the rear axle steering device 10 to set the rear wheel steering angle as a neutral steering angle when the distance between the vehicle and the obstacle is less than or equal to a predetermined dangerous distance.

Here, the determiner 20 may check the distance between the nearby obstacle and the vehicle through a camera, radar, LiDAR, or the like.

Furthermore, the predetermined dangerous distance may be set depending on the turning radius based on the state of the control of the rear axle steering device 10. Accordingly, the controller 30 may identify change in the position of the rear of the vehicle during turning of the vehicle, and may determine whether the vehicle collides based on whether obstacles are present in the vicinity of the vehicle to control the rear axle steering device 10.

As illustrated in FIG. 4, while the vehicle performs turning in the state in which an obstacle is present around the vehicle, the controller 30 controls the rear axle steering device 10 to set the rear wheel steering angle as a neutral steering angle. Accordingly, the rear wheel steering of the vehicle is aligned to be neutral when the vehicle performs turning, so that the rear of the vehicle does not collide with obstacles in the vicinity thereof and the vehicle stably performs turning.

Furthermore, when the vehicle performs turning when an obstacle is identified, the controller 30 controls the rear axle steering device 10 so that the rear wheel steering angle is controlled to be normal when the vehicle travels more than the set distance.

Here, the set distance may be a distance at which the vehicle leaves the surrounding obstacle and does not interfere with the obstacle.

Accordingly, the controller 30 sets the rear wheel steering angle as a neutral steering angle when the vehicle performs turning in the state in which an obstacle is present in the vicinity of the vehicle to thereby avoid collision between the vehicle and the obstacle. When the vehicle travels more than the set distance, this means that the vehicle has left the obstacle and safety is secured, and in the instant state, the rear wheel steering angle is controlled depending on the traveling condition of the vehicle.

As described above, in an exemplary embodiment of the present disclosure, the rear axle steering device 10 is controlled depending on whether there is an obstacle around the vehicle to thereby allow the vehicle to travel stably while avoiding collision between the vehicle and an obstacle.

Meanwhile, the controller 30 receives information on the traveling speed of the vehicle, and when the traveling speed is greater than or equal to a predetermined speed, the controller 30 controls the rear axle steering device 10 to decrease the rear wheel steering angle based on the increment in the traveling speed of the vehicle.

Here, the controller 30 may receive information on the traveling speed of the vehicle from a speed detector 40. Furthermore, the predetermined speed may be set by the controller 30 as a speed for securing turning stability during turning of the vehicle.

Accordingly, the controller 30 controls the rear axle steering device 10 based on the traveling speed of the vehicle, ensuring stability in traveling and turning of the vehicle.

For example, in the case in which the predetermined speed is set to 30, kph, the rear axle steering device 10 is normally controlled when the traveling speed of vehicle is less than 30 kph so that the turning radius is reduced and traveling efficiency is secured.

Here, when the traveling speed of the vehicle is equal to or greater than the predetermined speed, the control range of the rear wheel steering angle is reduced by the rear axle steering device 10, so that the traveling stability of the vehicle is secured. Furthermore, when the vehicle travels at a high speed, the rear wheel steering angle of the rear axle steering device 10 is set to be a maximum neutral steering angle, so that stability is secured in the high speed traveling condition.

As described above, according to an exemplary embodiment of the present disclosure, the traveling stability of the vehicle may be secured by controlling the rear axle steering device 10 based on the traveling speed of the vehicle.

Meanwhile, as shown in FIG. 5, a steering control method of the rear axle steering device 10 according to an exemplary embodiment of the present disclosure includes determining whether an avoidance target area is present around the vehicle in step S100, and controlling the rear axle steering device 10 to set the rear wheel steering angle as a neutral steering angle when it is determined that an avoidance target area is present around the vehicle in step S100.

Accordingly, in an exemplary embodiment of the present disclosure, the rear axle steering system 10 is controlled depending on whether an avoidance target area is present. In other words, upon determining that the avoidance target area is present in the vicinity of the vehicle, the rear axle steering device 10 is controlled to set the rear wheel steering angle as a neutral steering angle, preventing accidents in which the vehicle interferes with the avoidance target area due to the increase in the turning radius of the vehicle.

In the determining in step S100, the bus stop is stored as an avoidance target area, and whether the vehicle enters the bus stop is determined by the traveling direction of the vehicle.

Here, in the controlling in step S200, when the bus stop is input as an avoidance target area, the rear axle steering device 10 is controlled so that the rear wheel steering angle is set as a neutral steering angle when the vehicle enters the bus stop and then departs.

Accordingly, when the vehicle enters the bus stop, the rear axle steering device 10 is controlled so that the rear wheel steering angle is set as a neutral steering angle. Accordingly, the rear wheel steering of the vehicle is aligned to be neutral when the vehicle departs from the bus stop, so that the rear of the vehicle does not invade the bus stop and safely departs therefrom.

Furthermore, in the controlling in step S200, it is checked whether the vehicle departs after entering the bus stop, and the rear axle steering device 10 is controlled so that the rear wheel steering angle is controlled to be normal when the vehicle departs and travels more than a set distance.

Accordingly, the rear wheel steering angle is controlled to be a neutral steering angle when the vehicle departs from the bus stop to avoid interference between the vehicle and the bus stop. When the vehicle travels more than the set distance, this means that the vehicle has left the bus stop and safety is ensured, whereby the rear wheel steering angle is controlled based on the traveling condition of the vehicle.

As described above, in an exemplary embodiment of the present disclosure, the rear axle steering device 10 is controlled depending on whether the vehicle enters the bus stop or departs after entering the bus stop, allowing the vehicle to travel stably while avoiding collision with facilities or people at the bus stop.

The rear axle steering device 10 may be controlled according to steps S1 to S7 shown in the flowchart of FIG. 6.

Meanwhile, in the determining in step S100, an obstacle including other vehicles is stored as an avoidance target area, and whether an obstacle is present around the vehicle is determined.

Here, in the controlling in step S200, when obstacles including other vehicles are input as an avoidance target area, the rear axle steering device is controlled so that the rear wheel steering angle is set as a neutral steering angle while the vehicle performs turning.

Accordingly, while the vehicle performs turning in the state in which obstacles are present around the vehicle, the rear axle steering device 10 is controlled to set the rear wheel steering angle as a neutral steering angle. Accordingly, the rear wheel steering of the vehicle is aligned to be neutral when the vehicle performs turning, so that the rear of the vehicle does not collide with the obstacles in the vicinity thereof and the vehicle stably performs turning.

Furthermore, the distance between the vehicle and the obstacle is checked in the determining in step S100, and the rear axle steering device 10 is controlled so that the rear wheel steering angle is set as a neutral steering angle when the distance between the vehicle and the obstacle is less than or equal to a predetermined dangerous distance in the controlling in step S200.

Accordingly, the change in the position of the rear of the vehicle may be identified during turning of the vehicle, and whether the vehicle collides may be determined based on whether obstacles are present in the vicinity of the vehicle to control the rear axle steering device 10.

Furthermore, when the vehicle performs turning when an obstacle is identified, the rear axle steering device 10 is controlled to set the rear wheel steering angle as a neutral steering angle when the vehicle travels more than the set distance in the controlling in step S200.

Accordingly, in the controlling in step S200, the rear wheel steering angle is set as a neutral steering angle when the vehicle performs turning in the state in which an obstacle is present in the vicinity of the vehicle to thereby avoid collision between the vehicle and the obstacle. When the vehicle travels more than the set distance, this means that the vehicle has left the obstacle and safety is secured, and in the instant state, the rear wheel steering angle is controlled depending on the traveling condition of the vehicle.

As described above, in an exemplary embodiment of the present disclosure, the rear axle steering device 10 is controlled depending on whether there is an obstacle around the vehicle, allowing the vehicle to travel stably while avoiding collision between the vehicle and the obstacle.

The rear axle steering device 10 may be controlled according to steps S11 to S16 shown in the flowchart of FIG. 7.

Meanwhile, the steering control method further includes determining speed in step S300, in which information on the traveling speed of the vehicle is received, and when the traveling speed is greater than or equal to a predetermined speed, the rear axle steering device 10 is controlled to decrease the rear wheel steering angle based on the increment in the traveling speed of the vehicle.

Accordingly, when the traveling speed is equal to or greater than the predetermined speed, the control range of the rear wheel steering angle is reduced by the rear axle steering device 10, so that the traveling stability of the vehicle is secured in the controlling in step S200. Furthermore, when the vehicle travels at a high speed, the rear wheel steering angle of the rear axle steering device 10 is set to be a maximum neutral steering angle, so that stability is secured in the high speed traveling condition.

In an exemplary embodiment of the present invention, the high speed is a speed greater than the predetermined speed with a predetermined amount.

As described above, according to an exemplary embodiment of the present disclosure, traveling stability of the vehicle may be secured by controlling the rear axle steering device 10 based on the traveling speed of the vehicle.

In the system and method of controlling steering of the rear axle steering device 10 constructed as described above, conditions, under which the rear axle steering device 10 is operated, are diversified during traveling of a vehicle, facilitating stable traveling of the vehicle and preventing accidents.

As is apparent from the above description, various aspects of the present disclosure are directed to providing a system and method of controlling steering of a rear axle steering device, wherein the rear axle steering device is configured so that conditions, under which the rear axle steering device is operated, are diversified during traveling of a vehicle, facilitating stable traveling of the vehicle and preventing accidents.

In an exemplary embodiment of the present invention, the determiner 20 may be a processor or integrated into the controller 30, or implemented in a form of software.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A steering control system of a rear axle steering device, the steering control system comprising:
   the rear axle steering device configured to control a rear wheel steering angle of a vehicle;
   a determiner configured to determine whether an avoidance target area is present around the vehicle; and
   a controller configured to control the rear axle steering device to set the rear wheel steering angle as a neutral steering angle when the determiner determines that the avoidance target area is present around the vehicle.

2. The steering control system of claim 1, wherein the determiner is configured to store a bus stop as the avoidance target area, and configured to communicate with a nearby bus stop to determine whether the vehicle enters the bus stop.

3. The steering control system of claim 2, wherein whether the vehicle enters the bus stop is determined by a traveling direction of the vehicle.

4. The steering control system of claim 2, wherein, when the determiner inputs the bus stop as the avoidance target area, the controller is configured to control the rear axle steering device to set the rear wheel steering angle as the neutral steering angle when the vehicle enters the bus stop and then departs.

5. The steering control system of claim 4, wherein the controller is configured to check whether the vehicle departs after entering the bus stop, and configured to control the rear axle steering device so that the rear wheel steering angle is controlled to be normal while the vehicle travels more than a set distance when departing.

6. The steering control system of claim 1, wherein the determiner is configured to store an obstacle including other vehicles as the avoidance target area, and configured to detect whether the obstacle is present around the vehicle.

7. The steering control system of claim 6, wherein, when the determiner inputs obstacles including other vehicles as the avoidance target area, the controller is configured to control the rear axle steering device to set the rear wheel steering angle as the neutral steering angle while the vehicle performs turning thereof.

8. The steering control system of claim 7,
   wherein the determiner is configured to check information on a distance between the vehicle and the obstacle, and
   wherein the controller is configured to control the rear axle steering device to set the rear wheel steering angle as the neutral steering angle when the distance between the vehicle and the obstacle is less than or equal to a predetermined distance.

9. The steering control system of claim 6, wherein, while the vehicle performs turning thereof when the obstacle is identified, the controller is configured to control the rear axle steering device so that the rear wheel steering angle is controlled to be normal when the vehicle travels more than a set distance.

10. The steering control system of claim 1, wherein the controller is configured to receive information on a traveling speed of the vehicle, and when the traveling speed is greater than or equal to a predetermined speed, the controller is configured to control the rear axle steering device to decrease the rear wheel steering angle based on an increment in the traveling speed of the vehicle.

11. A steering control method of a rear axle steering device, the method comprising:
    determining, by a determiner, whether an avoidance target area is present around a vehicle; and
    controlling, by a controller, the rear axle steering device to set a rear wheel steering angle as a neutral steering angle when the determiner concludes that the avoidance target area is present around the vehicle in the determining.

12. The method of claim 11, wherein, in the determining, a bus stop is stored as the avoidance target area, and whether the vehicle enters the bus stop is determined by a traveling direction of the vehicle.

13. The method of claim 12, wherein, in the controlling, when the bus stop is input as the avoidance target area, the rear axle steering device is controlled so that the rear wheel steering angle is set as the neutral steering angle when the vehicle enters the bus stop and then departs.

14. The method of claim 13, wherein, in the controlling, when the vehicle departs after entering the bus stop is determined, the rear axle steering device is controlled so that the rear wheel steering angle is controlled to be normal when the vehicle departs and travels more than a set distance.

15. The method of claim 11, wherein, in the determining, an obstacle including other vehicles is stored as the avoidance target area, and whether the obstacle is present around the vehicle is determined.

16. The method of claim 15, wherein, in the controlling, when the obstacle including other vehicles is input as the avoidance target area, the rear axle steering device is controlled so that the rear wheel steering angle is set as the neutral steering angle while the vehicle performs turning thereof.

17. The method of claim 16,
wherein information on a distance between the vehicle and the obstacle is checked in the determining, and
wherein the rear axle steering device is controlled so that the rear wheel steering angle is set as the neutral steering angle when the distance between the vehicle and the obstacle is less than or equal to a predetermined distance in the controlling.

18. The method of claim 16, wherein, when the vehicle performs turning when the obstacle is identified, the rear axle steering device is controlled so that the rear wheel steering angle is controlled to be normal when the vehicle travels more than a set distance in the controlling.

19. The method of claim 11, further including:
determining speed, in which information on traveling speed of the vehicle is received by the controller,
wherein, when the traveling speed is greater than or equal to a predetermined speed, the rear axle steering device is controlled by the controller to decrease the rear wheel steering angle based on an increment in the traveling speed of the vehicle.

* * * * *